US012692996B2

(12) United States Patent
Sasahara

(10) Patent No.: US 12,692,996 B2
(45) Date of Patent: Jul. 28, 2026

(54) VEHICLE LAMP AND VEHICLE

(71) Applicant: ISUZU MOTORS LIMITED, Yokohama (JP)

(72) Inventor: Tomoya Sasahara, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/079,641

(22) Filed: Mar. 14, 2025

(65) Prior Publication Data

US 2025/0334247 A1 Oct. 30, 2025

(30) Foreign Application Priority Data

Apr. 30, 2024 (JP) ................................ 2024-073703

(51) Int. Cl.
*F21S 45/37* (2018.01)

(52) U.S. Cl.
CPC .................................... *F21S 45/37* (2018.01)

(58) Field of Classification Search
CPC ....................................................... F21S 45/37
See application file for complete search history.

(56) References Cited

U.S. PATENT DOCUMENTS 10,899,268 B1 * 1/2021 Kim ...................... F21S 43/237
2023/0062751 A1 * 3/2023 Katsurada ............ B60Q 1/0023

FOREIGN PATENT DOCUMENTS

JP 2010-015721 A 1/2010

* cited by examiner

*Primary Examiner* — Eric T Eide
(74) *Attorney, Agent, or Firm* — Shih IP Law Group, PLLC

(57) ABSTRACT

A rear lamp includes a housing, a partition part that is provided within the housing and divides the housing into a first region and a second region, a plurality of lamp units provided in the first region, and a measurement unit provided in the second region. The housing includes an opening part provided with an opening that communicates between the second region and the outside of the housing.

9 Claims, 4 Drawing Sheets

VEHICLE LAMP AND VEHICLE

CROSS-REFERENCE TO RELATED APPLICATIONS

The present application claims priority to Japanese Patent Applications number 2024-73703, filed on Apr. 30, 2024 contents of which are incorporated herein by reference in their entirety.

BACKGROUND OF THE INVENTION

The present disclosure relates to a vehicle lamp and a vehicle. Japanese Unexamined Patent Application Publication No. 2010-15721 discloses a vehicle lamp in which a measurement unit (specifically, a millimeter wave radar unit) is provided in a housing that accommodates a lamp unit. From the viewpoint of waterproofing the lamp unit, the interior of the housing is sealed.

In order to exhibit the performance of the measurement unit, it is necessary to suppress the temperature of the measurement unit to a predetermined temperature or less. However, since the inside of the housing is sealed, for example, when the outside air temperature is high, the temperature of the measurement unit in the housing becomes high. As a result, the measurement performance of the measurement unit may deteriorate.

BRIEF SUMMARY OF THE INVENTION

The present disclosure has been made in view of these points, and its object is to suppress a temperature rise in a measurement unit in a housing.

A first aspect of the present disclosure provides a vehicle lamp including: a housing; a partition part that is provided within the housing and divides an interior of the housing into a first region and a second region; a plurality of lamp units provided in the first region; and a measurement unit provided in the second region, wherein the housing includes an opening part provided with an opening that communicates between the second region and the outside of the housing.

A second aspect of the present disclosure provides a vehicle including: the vehicle lamp; and a fixing portion to which the support part is fixed, wherein a gap is formed in the support part between the opening part and the fixing portion, and the second region communicates with the gap that allows outside air to be taken in.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Overview of a Vehicle>

Figure 1:
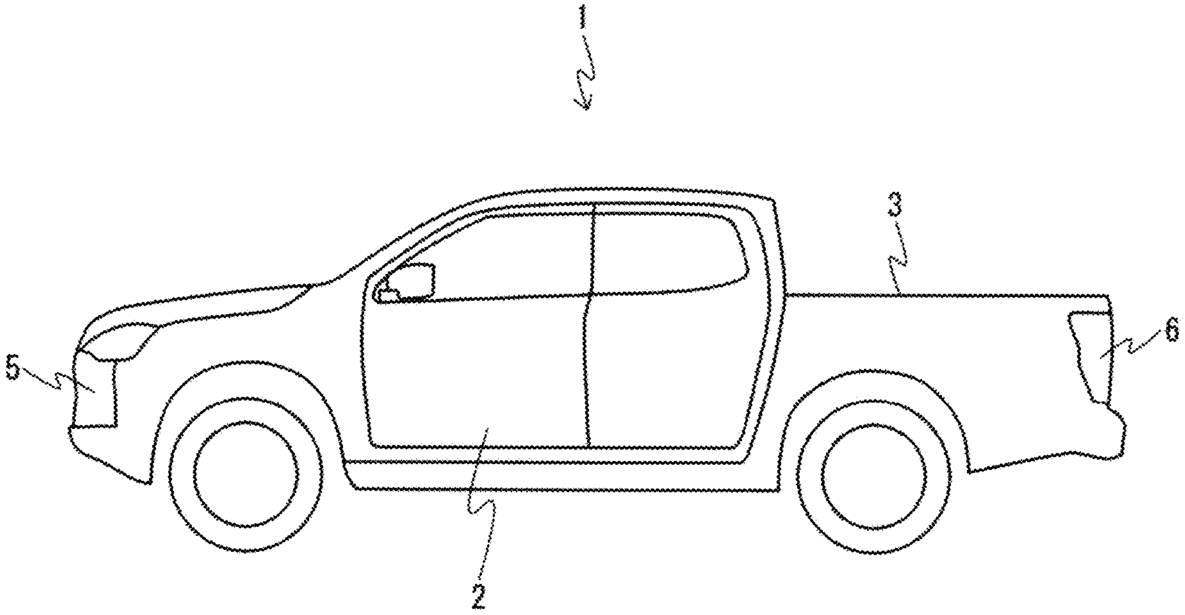
FIG. 1 is a schematic diagram illustrating a vehicle 1 according to one embodiment.

FIG. 1 is a schematic diagram illustrating a vehicle 1 according to one embodiment. The vehicle 1 is, for example, a pickup truck. As shown in FIG. 1, the vehicle 1 includes a cabin 2, a cargo bed 3, a front lamp 5, and a rear lamp 6.

The cabin 2 is a passenger compartment in which a passenger of the vehicle 1 is seated. The cabin 2 is provided on a pair of side frames extending in the front-rear direction of the vehicle 1. The cargo bed 3 is provided behind the cabin 2, and is an area for loading goods. The cargo bed 3 is also provided on the side frames.

The front lamp 5 is a lamp provided at the front of the vehicle 1. One front lamp 5 is provided on each side of the front of the vehicle 1. The front lamp 5 includes, for example, a headlight. The headlight is provided in a housing of the front lamp 5.

The rear lamp 6 is a lamp provided at the rear of the vehicle 1. One rear lamp 6 is provided on each side of the rear of the vehicle 1. The rear lamp 6 is, as one example, a combination lamp in which a plurality of lamps are grouped together, and is replaceable. The rear lamp 6 includes, for example, a lamp unit including at least one of a brake lamp, a turn signal lamp, or a tail lamp. The lamp unit is provided in a housing of the rear lamp 6.

A measurement unit, such as a radar, is also provided in the housing of the rear lamp 6. Although details will be described later, the rear lamp 6 is configured to suppress a temperature rise in the measurement unit in the housing.

<Detailed Configuration of the Rear Lamp 6>

The detailed configuration of the rear lamp 6, which is a vehicle lamp, will be described with reference to FIGS. 2 and 3. Two rear lamps 6 are respectively provided on the left and right sides of the rear of the vehicle 1, and the two rear lamps 6 have the same configuration.

Figure 2:
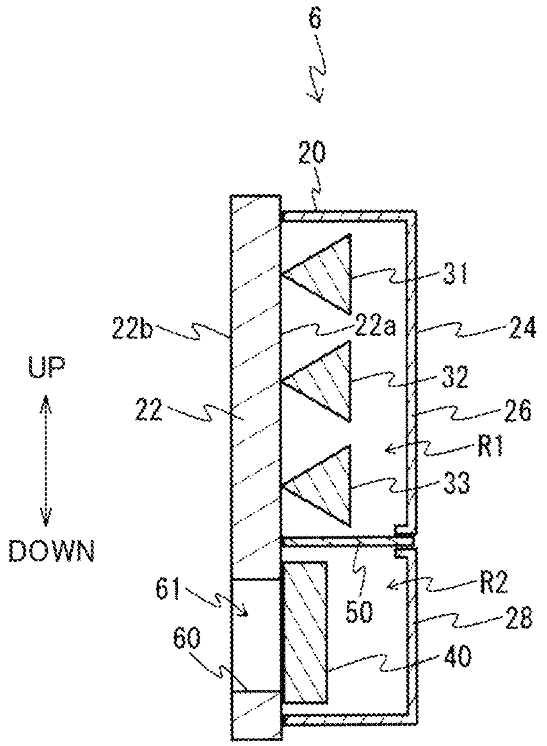
FIG. 2 is a schematic diagram showing an internal configuration of a rear lamp 6.
Figure 3:
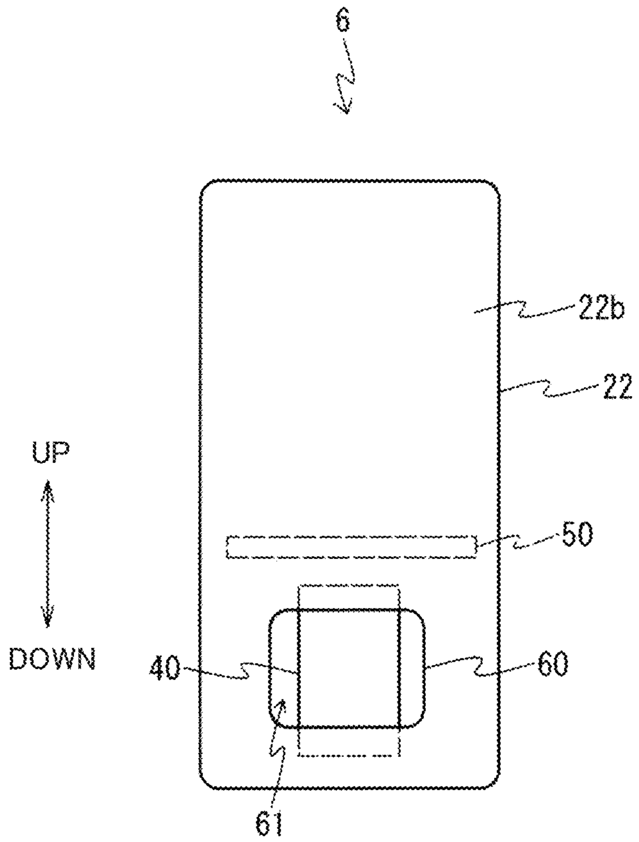
FIG. 3 is a schematic rear view of the rear lamp 6 shown in FIG. 2.

FIG. 2 is a schematic diagram showing an internal configuration of the rear lamp 6. The rear lamp 6 includes a housing 20, lamp units 31, 32, and 33, a measurement unit 40, a partition part 50, and an opening part 60. It goes without saying that the shapes of the lamp units 31, 32, and 33 and the measurement unit 40 in FIG. 2 are shown schematically and that various forms of lamps and sensors may be used.

The housing 20 forms a casing of the rear lamp 6. The housing 20 is detachably attached to the rear of the vehicle 1. The lamp units 31 to 33 and the measurement unit 40 are provided in the housing 20. The housing 20 includes a support part 22 and a cover member 24.

The support part 22 supports the lamp units 31 to 33 and the measurement unit 40. In this embodiment, the support part 22 has a flat plate shape with a predetermined thickness. The support part 22 has a support surface 22*a* that supports the lamp units 31 to 33 and the measurement unit 40. Each of the lamp units 31 to 33 and the measurement unit 40 is fixed to the support part 22 using screw members, adhesives, or similar fastening means, thereby being supported by the support part 22.

The support part 22 is fixed to a fixing portion of the rear of the vehicle 1. Specifically, an opposite surface 22*b* of the support part 22, which is a surface opposite to the support surface 22*a*, is fixed to the fixing portion of the vehicle 1. The lower portion of the opposite surface 22*b*, including the opening part 60 and its surrounding area, is not fixed to the fixing portion of the vehicle 1, thereby forming a gap between the lower portion and the rear of the vehicle 1. Therefore, when the vehicle 1 travels, traveling wind from the front strikes the lower portion of the opposite surface 22*b*. For example, a region of the opposite surface 22*b* of the support part 22 corresponding to the area where the lamp units 31 to 33 are provided on the support surface 22*a* is fixed such that it overlaps with a portion constituting the rear of the vehicle 1. The housing 20 is fixed to the vehicle 1 such that a region of the opposite surface 22*b* of the support part 22, corresponding to the area where the measurement unit 40 is provided on the support surface 22*a*, communicates with a space (a gap between the lower portion of the opposite surface 22*b* and the rear of the vehicle 1) at the rear of the vehicle 1, allowing outside air (traveling wind) to enter.

The cover member 24 is a lid member that covers the rear side of the housing 20 in the traveling direction of the vehicle 1, and faces the rear of the vehicle 1. The cover member 24 encloses the lamp units 31 to 33 and the measurement unit 40, preventing the lamp unit 30 and the measurement unit 40 from being exposed to the outside. A space enclosed by the support part 22 and the cover member 24 constitutes an internal space of the housing 20. The internal space of the housing 20 includes a first region R1 that houses the lamp units 31 to 33 and a second region R2 that houses the measurement unit 40. In this embodiment, the first region R1 is located above the second region R2. The cover member 24 is made of resin, for example.

The cover member 24 includes a first cover part 26 and a second cover part 28. The first cover part 26 is positioned above, and the second cover part 28 is positioned below. The first cover part 26 and the second cover part 28 can be independently detached. This allows the replacement, adjustment, or other maintenance of the lamp units 31 to 33 or the measurement unit 40 without needing to remove the entire cover member 24.

The first cover part 26 is a portion of the cover member 24 corresponding to the first region R1. The first cover part 26 covers the lamp units 31 to 33 located in the first region R1. One end of the first cover part 26 is supported by the support part 22, and the other end of the first cover part 26 is supported by the partition part 50.

The second cover part 28 is a portion of the cover member 24 corresponding to the second region R2. The second cover part 28 covers the measurement unit 40 located in the second region R2. One end portion of the second cover part 28 is supported by the support part 22, and the other end portion of the second cover part 28 is supported by the partition part 50.

The electromagnetic wave transmittance of the second cover part 28 differs from the electromagnetic wave transmittance of the first cover part 26. The electromagnetic wave transmittance of the second cover part 28 is set, for example, to a value that allows electromagnetic waves output by the measurement unit 40 to pass through easily. Therefore, since the measurement unit 40 can appropriately receive electromagnetic waves, it is possible to suppress the reduction of measurement accuracy.

The lamp units 31 to 33 are brake lamps, turn signal lamps, and tail lamps. The lamp units 31 to 33 are provided in the first region R1 within the housing 20. By outputting visible light, the lamp units 31 to 33 notify those behind the vehicle 1 about the operational state of the vehicle 1. As shown in FIG. 2, the lamp units 31 to 33 are arranged in a row in the vertical direction within the housing 20. Specifically, the lamp unit 31 is located at the uppermost position, and the lamp unit 33 is located at the lowermost position.

The measurement unit 40 detects a measurement target behind the vehicle 1 and measures a distance from the vehicle 1 to the measurement target. The measurement unit 40 is a radar unit that receives reflected waves, which are the electromagnetic waves output by the measurement unit 40 and reflected off the measurement target. The measurement target includes, for example, a vehicle, an obstacle, or similar objects behind the vehicle 1. As shown in FIG. 2, the measurement unit 40 is provided in the second region R2 within the housing 20. That is, the measurement unit 40 and the lamp units 31 to 33 are provided in different regions within the housing 20. The measurement unit 40 is provided below the lamp units 31 to 33 within the housing 20.

The partition part 50 is a member provided within the housing 20. The partition part 50 is positioned between (i) the lamp units 31 to 33 and (ii) the measurement unit 40. The partition part 50 is provided so as to partition the internal space of the housing 20 into two regions. As one example, the partition part 50 has a flat plate shape. An internal space in the upper portion of the housing 20, enclosed by the support part 22, the first cover part 26, and the partition part 50, constitutes the first region R1. An internal space in the lower portion of the housing 20, enclosed by the support part 22, the second cover part 28, and the partition part 50, constitutes the second region R2. In other words, the partition part 50 can be described as a partition plate that divides the internal space of the housing 20 into the first region R1 and the second region R2. The partition part 50 can also be considered a wall member that partitions the interior of the housing 20 so that the first region R1 and the second region R2 do not communicate with each other. The partition part 50 partitions the internal space of the housing 20 such that the first region R1 is wider than the second region R2.

The partition part 50 is fixed to the support part 22. Specifically, one end of the partition part 50 is fixed to the support surface 22*a* of the support part 22. The other end of the partition part 50 engages with the cover member 24. For example, an engaging part with which the first cover part 26 and the second cover part 28 can engage is formed at the other end of the partition part 50.

The opening part 60 is a portion of the support part 22 where an opening (ventilation port) 61 is formed, allowing the inside and the outside of the housing 20 to communicate with each other. The opening part 60 is formed in a portion of the support part 22 that constitutes the second region R2 in the housing 20. Specifically, the opening part 60 is provided in the portion of the support part 22, below where the measurement unit 40 is provided, in an area where a gap is formed between the support part 22 and the rear of the vehicle 1. In this way, external air (e.g., traveling wind) can easily enter the second region R2, where the measurement unit 40 is located, via the opening part 60, thereby suppressing a temperature rise in the measurement unit 40. As a result, the temperature of the measurement unit 40 can be easily maintained at or below the optimal operating temperature, thereby preventing deterioration in a measurement performance of the measurement unit 40. Although water may infiltrate the second region R2 through the opening part 60, the waterproof properties of the measurement unit 40 ensure that its measurement accuracy is not affected by water.

As shown in FIG. 2, the opening part 60 penetrates the lower portion of the support part 22. That is, the opening part 60 extends through from the support surface 22*a* to the opposite surface 22*b*. FIG. 3 is a schematic view of the rear lamp 6 shown in FIG. 2 as viewed from the back side. Here, as shown in FIG. 3, a rectangular opening 61 is formed in the opening part 60, however the present disclosure is not limited to this, and the opening 61 may instead be circular, for example. The opening part 60 is formed in a portion of the support part 22 facing the back surface of the measurement unit 40. In this way, the outside air that has passed through the opening part 60 easily comes into contact with the back surface of the measurement unit 40, thereby cooling the measurement unit 40.

The opening 61 may be formed so that the entire back surface of the measurement unit 40 is exposed. That is, the size of the opening 61 may be larger than the entire back surface of the measurement unit 40, and the measurement unit 40 may be positioned to face the opening 61. For example, by adopting a structure in which the measurement unit 40 is supported by the support part 22, the entire back surface of the measurement unit 40 can be exposed. In this way, the outside air comes into contact with a broader area of the measurement unit 40, thereby increasing the cooling efficiency of the measurement unit 40. In particular, when the vehicle 1 travels, the traveling wind readily strikes the measurement unit 40, further improving the cooling efficiency of the measurement unit 40. In addition, a net-like filter member or the like may be provided over the opening 61 of the opening part 60 in order to suppress entry of foreign matter into the internal space of the housing 20.

No opening part is formed in a portion of the support part 22 corresponding to the first region R1. That is, the first region R1 is a region sealed by the support part 22, the cover member 24, and the partition part 50. By sealing the first region R1 in this manner, water, dust, and the like can be prevented from entering the first region R1.

Figure 4:
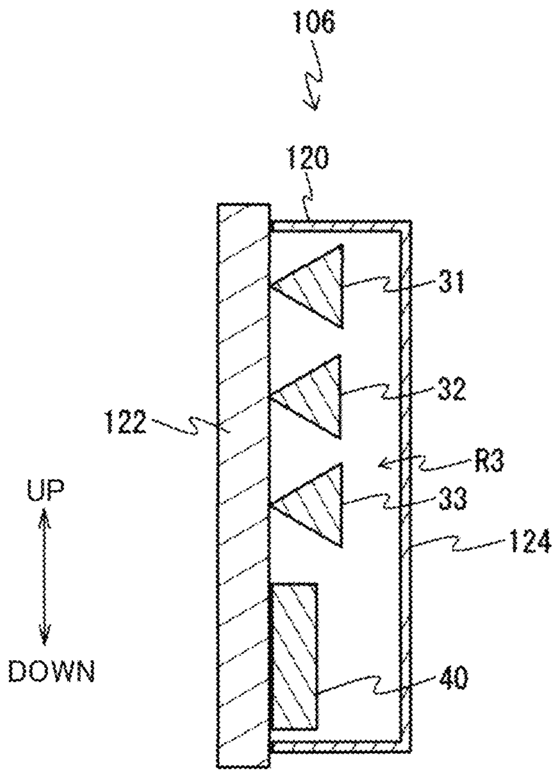
FIG. 4 is a schematic view showing a rear lamp 106 according to a comparative example.

The advantages of providing the partition part 50 and the opening part 60 in the housing 20 will be described by comparing it with a comparative example shown in FIG. 4. FIG. 4 is a schematic view illustrating a rear lamp 106 according to the comparative example. In the comparative example, the partition part 50 and the opening part 60 are not provided in a housing 120, and the lamp units 31 to 33 and the measurement unit 40 are located within a space R3 of the housing 120. The space R3 is sealed by a cover member 124. Therefore, while water infiltration into the housing 120 is prevented, the temperature of the measurement unit 40 increases due to the sealed nature of the space R3, potentially causing a deterioration in the measurement performance of the measurement unit 40. In particular, the temperature of the measurement unit 40 sealed within the space R3 is prone to increase in environments with high outside air temperature.

In contrast, in the present embodiment, by providing the partition part 50 and the opening part 60, the outside air can easily enter the second region R2, where the measurement unit 40 is located, while maintaining the sealed state of the first region R1, where the lamp units 31 to 33 are located. Therefore, the measurement unit 40 is cooled by the outside air, and the temperature rise in the measurement unit 40 can be suppressed, thereby preventing deterioration in the measurement performance of the measurement unit 40 caused by the temperature rise.

Modification

In the above description, the measurement unit 40 is the radar unit, but it is not limited to this. For example, the measurement unit 40 may be a LiDAR (Light Detection And Ranging) unit. The LiDAR radiates a laser beam onto a measurement target and receives the laser beam reflected from the measurement target.

In the above description, the first cover part 26 and the second cover part 28 of the cover member 24 are separable, but the present disclosure is not limited thereto. For example, in the cover member 24, the first cover part 26 and the second cover part 28 may be integrated into a single unit.

Furthermore, in the above description, the partition part 50 is described as a separate component from the support part 22 and the cover member 24, but the present disclosure is not limited thereto. For example, the partition part 50 may be integrated with any of one or more of the support part 22, the first cover part 26, and the second cover part 28.

In the above description, the rear lamp 6 is used as an example of the vehicle lamp, but the present disclosure is not limited thereto. For example, the vehicle lamp may be the front lamp 5 that includes a measurement unit. In this case, the front lamp 5 is provided with the partition part 50 and the opening part 60.

Effects of the Embodiment

The rear lamp 6 (vehicle lamp) of the above-described embodiment has the partition part 50 that divides the interior of the housing 20 into the first region R1 in which the lamp units 31 to 33 are located and the second region R2 in which the measurement unit 40 is located, and an opening part 60 formed in a portion of the housing 20 in contact with the second region R2. Since the outside air can flow into the second region R2 in which the measurement unit 40 is located through the opening part 60, the measurement unit 40 is cooled by the outside air, thereby suppressing a temperature rise in the measurement unit 40.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A vehicle lamp comprising:

a single housing including a support part and a cover member, the support part has a support surface;

a single partition wall that is provided within the housing and divides an interior of the housing into a first region and a second region;

a plurality of lamp units provided on the support surface corresponding to the first region;

a measurement unit provided on the support surface corresponding to the second region, and an opening part that is a portion of the support part where an opening is formed, allowing the second region and the outside of the housing to communicate with each other, wherein the support surface supports the plurality of lamp units and the measurement unit, and the opening is located at a portion of the support surface facing the back surface of the measurement unit.

2. The vehicle lamp according to claim 1, wherein the cover member that-covers the lamp units and the measurement unit, the partition wall has one end fixed to the support surface of the support part and the other end engaging with the cover member, and the first region is a region sealed by the support part, the cover member, and the partition wall.

3. The vehicle lamp according to claim 2, wherein the cover member includes:

a first cover part that covers the lamp units; and a second cover part that covers the measurement unit and has an electromagnetic wave transmittance that differs from an electromagnetic wave transmittance of the first cover part.

4. The vehicle lamp according to claim 1, wherein the housing is detachably attached to the rear of a vehicle, and the lamp units include at least one of a brake lamp, a turn signal lamp, or a tail lamp.

5. The vehicle lamp according to claim 1, wherein the measurement unit is a radar unit that receives output electromagnetic waves.

6. A vehicle comprising:

the vehicle lamp according to claim 1; and a fixing portion to which the support part is fixed, wherein a gap is formed in the support part between the opening part and the fixing portion, and the second region communicates with the gap that allows outside air to be taken in.

7. The vehicle according to claim 6, wherein the vehicle lamp is a rear lamp fixed to the fixing portion of the rear of the vehicle, and the second region communicates with the gap that allows traveling wind of the vehicle to be taken in.

8. The vehicle lamp according to claim 1, wherein the support part has a single support surface that supports the lamp units and the measurement unit, and one end of the partition wall is fixed to the support surface.

9. The vehicle lamp according to claim 1, wherein the partition part is integrated with the support part, and the first region is a region sealed by the support part, the cover member, and the partition wall.

* * * * *